Dec. 14, 1971  E. A. PECKER  3,626,670
FLUID CIRCULATION APPARATUS INCLUDING DEAERATION
AND NEGATIVE PRESSURE CONTROL
Filed June 30, 1970

INVENTOR.
EDWIN A. PECKER
BY
*Edward M. Loreman*
ATTORNEY

United States Patent Office 3,626,670
Patented Dec. 14, 1971

3,626,670
FLUID CIRCULATION APPARATUS INCLUDING DEAERATION AND NEGATIVE PRESSURE CONTROL
Edwin A. Pecker, Los Angeles, Calif., assignor to Vernitron Corporation, Great Neck, N.Y.
Continuation-in-part of application Ser. No. 809,792, Mar. 24, 1969. This application June 30, 1970, Ser. No. 52,220
Int. Cl. B01d 19/00
U.S. Cl. 55—159    10 Claims

ABSTRACT OF THE DISCLOSURE

A fluid circulation system includes a suction pump and valve controlled recirculating loop for adjustably maintaining fluid pressure within a specified range at the pump, with a deaerator disposed in a fluid supply line to continuously remove air from the fluid and to pass it via a bleed line to the pump. A fluid flow restrictor in the recirculating loop maintains a pressure differential between the pump and the fluid supply source. Two stages of deaeration may be provided as well as a restrictor in the bleed line to limit passage of fluid through the bleed line.

---

This invention is a continuation-in-part of and involves improvements in my copending patent application Ser. No. 809,792, filed Mar. 24, 1969 and entitled, "Fluid Circulating System."

The present invention relates to fluid circulation apparatus and more particularly involves means for deaerating a dialysate solution in a blood purification apparatus operating under controlled negative pressure.

In the above mentioned patent application, I have described a novel closed system which draws a continuous flow of dialysate fluid through a dialyzer (artifical kidney), and permits adjustment of the pressure of the dialysate to any desired level. The system comprises a recirculating pump of relatively high flow rate compared to the fluid flow rate through the dialyzer with a recirculating loop which includes a throttling valve, and an overflow or drain located between the pump and throttling valve. The dialyzer is connected to the recirculating loop on the negative pressure or suction side between the throttling valve and pump.

The dialysate fluid used in a system as described above is a water base solution which contains dissolved air. In order to provide a reduced dialysate pressure within the dialyzer, the dialysate fluid must be drawn through a restrictor such as a throttling valve located in advance of the dialyzer. The fluid pressure drops across the restrictor or valve to provide the desired negative pressure, which is controlled downstream from the dialyzer at the recirculating loop. As the fluid pressure is reduced across the restrictor the dissolved air tends to outgas. This released air, if not removed from the dialysate fluid, carries into the dialyzer where it can pass across a semi-permeable membrane therein into the purified blood. An air trap is generally provided in the extra-corporeal blood circuit connected to the dialyzer to remove such air; but under a combination of conditions such as a large amount of dissolved air in the supply fluid, or operation under extreme negative pressures, the amount of air transferred into the blood circuit is quite large. This requires excessively frequent emptying of the air trap, at considerable inconvenience to the patient and attendant medical personnel.

The present invention is directed at overcoming the above and other difficulties, disadvantages and objections inherent in prior blood purification systems due to the presence of air in the dialysate fluid.

In accordance with the invention there is provided a suction pump connected to the outlet end of a dialyzer with the pump adapted to maintain a negative suction pressure on the fluid. The outlet conduit from the pump includes a return or bypass conduit leading to the upstream or inlet end of the pump and also into the outlet end or downstream conduit of the dialyzer. The inlet to the dialyzer is connected to a supply of dialysate fluid. In order to prevent air in the dialysate fluid from flowing to the dialyser, an air chamber is connected between the dialyzer and the inlet to the dialysate fluid supply. A venting end of the air chamber is connected to the inlet of the pump via a restrictor to control the amount of dialysate fluid which is removed from the system with the air venting.

Accordingly, it is a primary object of the present invention to provide for a novel and improved dialysate solution circulating system.

Another object of the present invention is to provide for a novel and simplified dialysate solution circulating system which removes air from the dialysate fluid before it enters the dialyzer.

A more particular object of the present invention is to provide a dialysate solution circulating system having a chamber to trap and remove air from the dialysate fluid.

These and other objects and many of the attendant advantages of this invention will be readily appreciated as the same becomes better understood by reference to the following detailed description when considered in connection with the accompanying drawings in which.

Figure 1:
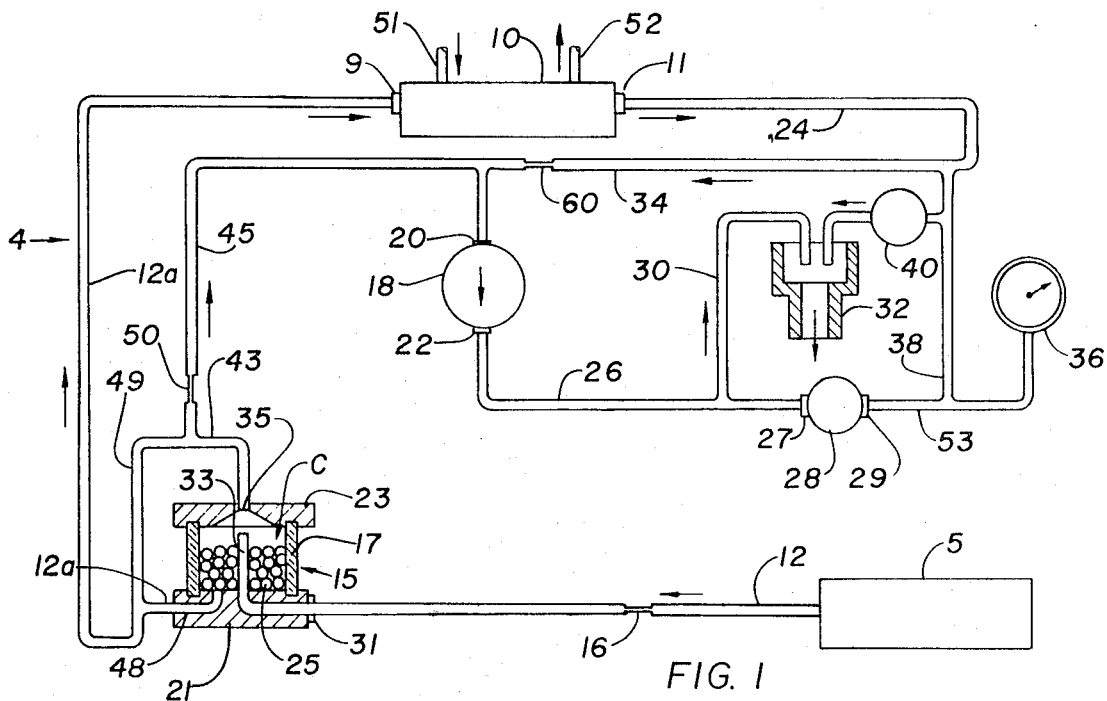
FIG. 1 is a diagram of the dialysate circulating system embodying the instant invention.

Referring now to the drawings wherein like reference characters designate like or corresponding parts throughout, there is illustrated in FIG. 1, a fluid circulation system generally designated as reference numeral 4 comprising a dialysate fluid supply source 5 which may be any suitable character or type. The fluid is supplied at a pressure above atmospheric pressure. The fluid if fed via a conduit 12 to an air trap 15 via a flow restrictor or throttle valve 16. The air trap 15 may comprise a cylindrical wall 17 closed at top and bottom by a base plate 21 and a top plate 23 respectively. A chamber C is thus defined in the air trap. This chamber may for example be about three inches in diameter which will be quite large when compared with the flow rate of the dialysate so that the flow velocity of the fluid through the chamber is extremely slow, allowing air bubbles to rise to the fluid surface without being carried along in the flowing dialysate stream. The chamber C may be loosely filled with inert granules 25 in order to assist bubbles to separate out of the dialysate fluid. The air trap 15 has an inlet 31 at the base plate 21 where the conduit 12 is connected to supply the dialysate fluid to air trap. A tube 33 extends axially upward in the air trap 15 and opens above the top of the granules 25, and also above the level of fluid in chamber C. A bypass conduit 43 is connected between a bleed tube 45 and an aperature 35 in the top plate 23. Connected to an outlet 48 in the base plate 21 and communicating with the Chamber C is a conduit 12a which feeds dialysate fluid to inlet 9 of the dialyzer 10. A bypass conduit 49 is connected between the bleed tube 45 and the conduit 12a. Since dialysate fluid under normal conditions will tend to flow both to the dialyzer 10 as well as through the air bleed line 45, a fixed flow restrictor 50 with a small orifice is placed in the air bleed line 45. This restricts the amount of dialysate flowing through the air bleed line 45 and avoids excessive waste of dialysate fluid. The restrictor orifice 50 is large enough to permit complete bleed of air therethrough. This restrictor is located as close as possible to the air strap 15 to effect optimum deaeration, although effective deaeration will occur if the restrictor is placed anywhere in the air bleed line 45. It is, of course, possible to employ the conduit 45 as a flow restrictor in place of the restrictor 50 if conduit 45 has a sufficiently narrow bore.

The dialyzer 10 may be only one of a known type, such as the generally and widely known Kiil type. Blood to be purified is admitted to the dialyzer 10 via conduit 51 and leaves in purified condition via a conduit 52. Spent dialysate fluid leaves the dialyzer 10 via outlet 11 and flows through a conduit 24 connected to an inlet 20 of a suction pump 18. The suction pump 18 provides positive dialysate fluid flow. A conduit 26 is connected to an outlet 22 of the pump 18 and it is connected via another conduit 30 to a drain 32 where part or all of the spent dialysate fluid is discharged. Conduit 26 is also connected to an inlet 27 of a flow restrictor or manually controlled throttle valve 28 which controls negative pressure in the system. This valve may be operated to shut off or alternatively control the amount of dialysate fluid flow through a conduit 53 connected to outlet 29 of the valve 28. Closing the valve 28 will permit all the spent fluid to pass into the drain 32 whereas opening the valve will permit a portion of the fluid to flow therethrough. Valve 28 and the conduit 53 form part of a recirculating loop which includes a conduit 34 connected at one end to a conduit 38 which in turn is connected to the conduit 53. The other end of conduit 34 is connected to the inlet or suction port 20 of the pump 18.

A fixed flow restrictor 60 is further provided in the segment of the recirculating loop including conduit 34. This restrictor reduces the pressure level at which air may be bled from the dialysate fluid. This pressure level remains low with respect to the pressure of fluid in the air trap 15. It is, of course, possible to employ the conduit 34 as a flow restrictor in place of the restrictor 60 if this conduit has a sufficiently narrow bore. In any case a fixed flow restrictor is provided at the suction side of the pump 18. The pressure level between the restrictor 60 and the inlet 20 of the pump is reduced below the pressure level of the fluid flowing from the outlet 11 of the dialyzer via conduit 24 to the pump 18. Also as mentioned above the pressure level between the restrictor 60 and the pump 18 is reduced below the pressure level of the fluid in the deaerator or air trap 15. This lower pressure level between the restrictor 60 and the pump inlet 20 assures continuous bleed of fluid and air from the deaerator 15. Suitable selection of the size of the pump 18, the bore in the restrictor 60, and the bore in the restrictor 50, will provide any desired pressure level of deaeration.

A valve 40 is connected between the conduit 38 and the drain 32 and will open if a positive pressure above the valve setting occurs in the conduit 34. Such a pressure if excessive may cause a dangerous back pressure condition in the dialyzer. This condition is avoided by the automatic opening of valve 40 to allow fluid to pass to the drain 32. The valve 28 may be adjusted to adjust the negative pressure at the dialyzer. The flow restrictors 50 and 60 will automatically maintain differential pressure to insure proper air bleed. It should be emphasized that without the flow restrictors, particularly flow restrictor 60, there would be very little pressure difference between the dialysate fluid at the deaerating chamber C which is upstream from dialyzer 10 and the recirculating pump 18 which is downstream from the dialyzer. The pressure difference between these two points in the fluid line would normally be due only to the slight pressure drop occurring due to the resistance in the fluid lines or conduits and the dialyzer itself. These are relatively small. Therefore, although air would tend to flow from the deaerator into the recirculaitng loop, the differential pressure causing this flow would be relatively small and therefore, the deaeration would be relatively limited. The present invention overcomes this situation by providing means for reducing the pressure level to which the air may bleed. This pressure (inlet 20) remains at a low level in relation to the pressure in the deaerator 15 under all conditions of adjustment of the negative pressure. As mentioned above, this desirable result is accomplished by restricting the recirculating line on the suction side of the pump 18 by the fixed restrictors. A gauge 36 provides continuous readings of negative pressure maintained in the recirculating loop.

Figure 2:
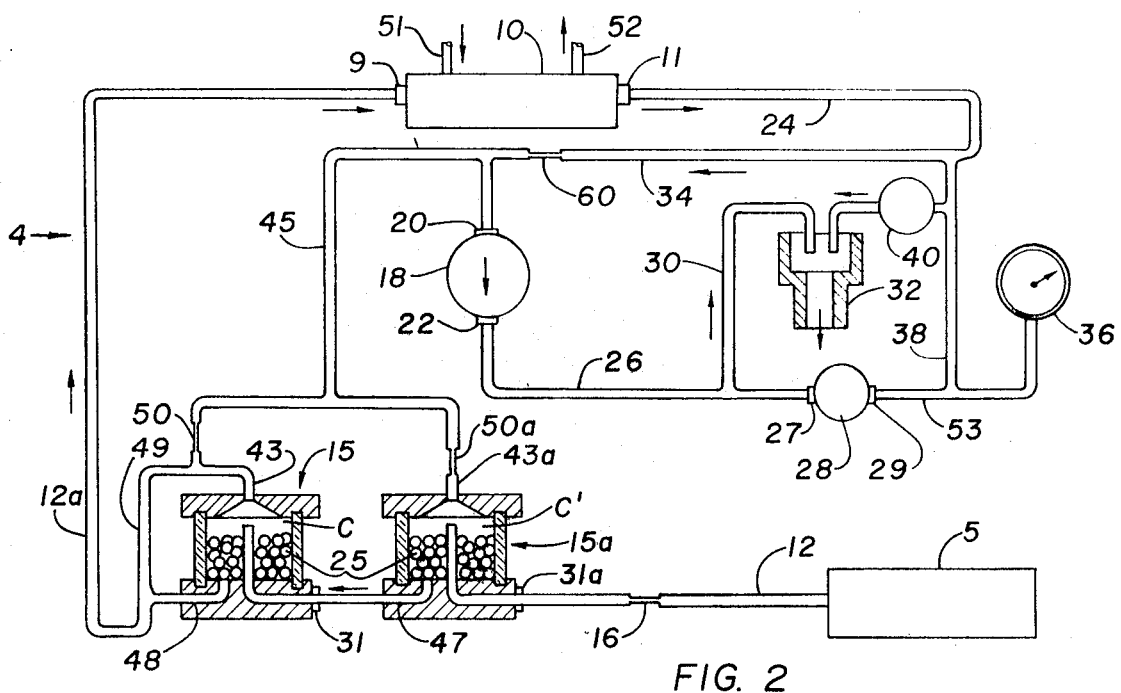
FIG. 2 is a diagram of another dialysate circulating system embodying a modification of the invention.

FIG. 2 shows another fluid circulation system adapted for deaeration of the dialysate fluid. Parts corresponding to those of the system of FIG. 1 are identically numbered. In the system of FIG. 2, another deaerator or air trap 15a is provided. Another flow restrictor 50a is provided in an outlet 43a connected to the air bleed line 45. The conduit 12 is connected via the restrictor 16 to an inlet 31a of the air trap 15a. The outlet 47 of the air trap 15a is connected to the inlet 31 of the air trap 15. By the arrangement described, two stages of deaeration are provided. If any dialysate fluid passing to the air trap 15 via the outlet 47 of the air trap 15a contains any residual air bubbles, they will be effectively eliminated in the second stage of deaeration in the air trap 15. All air bubbles released in chambers C and C′ of the two air traps will pass up the air bleed line 45 to the pump 18. The two air traps thus cooperate to optimize deaeration at minimal fluid bypass rates.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

I claim:

1. A fluid circulation system adapted to convey and maintain a flow of deaerated fluid to a dialyzer within a predetermined pressure range, comprising:
   means providing a supply of fluid;
   a suction pump means having an inlet and an outlet; with said inlet connected to the outlet of said dialyzer;
   an air trap connected to said fluid supply means for removing air bubbles from said fluid;
   a recirculation loop connecting said inlet and said outlet to maintain a pressure at said inlet which is less than the pressure of fluid passing to said air trap;
   and a first conduit means connected to said air trap to pass fluid substantially free of dissolved air from said air trap to the inlet of said dialyzer.

2. A fluid circulation system as defined in claim 1, further comprising a second conduit means connected between said air trap and said inlet of said pump to pass air removed from said fluid supply means to said suction pump.

3. A fluid circulation system as defined in claim 1, further comprising a flow restrictor in said recirculation loop for maintaining the pressure at said inlet at a lower level than the pressure of fluid passing to said air trap from said fluid supply means.

4. A fluid circulation system as defined in claim 2, further comprising a bypass line connected between said second conduit means and said first conduit means for draining deaerated fluid while air passes to said suction pump.

5. A fluid circulation system as defined in claim 4, further comprising a first flow restrictor in said second conduit means cooperating with said bypass line to minimize the amount of fluid passing through said second conduit means while freely passing air therethrough.

6. A fluid circulation system as defined in claim 5, further comprising a second flow restrictor in said recirculation loop to maintain the pressure at said inlet at a lower level than the pressure of fluid passing to said air trap from said fluid supply means.

7. A fluid circulation system as defined in claim 2, further comprising a second air trap connected between said air trap and said fluid supply means to serve as a first stage fluid deaerator, said second air trap having an air outlet connected to said second conduit means, and having a fluid outlet connected to said air trap.

8. A fluid circulation system as defined in claim 3, wherein said first conduit means is connected in circuit with said inlet of said pump so that air passing to said pump bypasses the fluid in said first conduit means.

9. A fluid circulation system as defined in claim 3, wherein said first conduit means is connected to said recirculation loop so that the pressure maintained at said inlet of said pump is less than the pressure of fluid in said first conduit means.

10. A fluid circulation system as defined in claim 3, further comprising valve in said recirculation loop for adjusting the pressure at said inlet of said pump in a range less than the pressure of the fluid passing to said air trap and less than the pressure of fluid in said first conduit means.

References Cited
FOREIGN PATENTS 1,191,586   5/1970   Great Britain _____ 210—22

REUBEN FRIEDMAN, Primary Examiner

R. W. BURKS, Assistant Examiner

U.S. Cl. X.R.

210—321